United States Patent [19]
Nagaishi et al.

[11] Patent Number: 6,058,905
[45] Date of Patent: May 9, 2000

[54] FUEL INJECTION CONTROL SYSTEM FOR INTERNAL COMBUSTION ENGINE

[75] Inventors: Hatsuo Nagaishi, Yokohama; Takamasa Ueda; Hiroshi Iwano, both of Kanagawa; Yuki Nakajima, Yokohama, all of Japan

[73] Assignee: Nissan Motor Co., Ltd., Yokohama, Japan

[21] Appl. No.: 09/108,409

[22] Filed: Jul. 1, 1998

[30]  Foreign Application Priority Data

Jul. 1, 1997 [JP] Japan .................................. 9-176239
Jul. 1, 1997 [JP] Japan .................................. 9-176240

[51] Int. Cl.$^7$ .................................................. F02B 17/00
[52] U.S. Cl. ........................... 123/295; 123/299; 123/305
[58] Field of Search ................................. 123/295, 299, 123/300, 305

[56]  References Cited

U.S. PATENT DOCUMENTS 4,955,339  9/1990  Sasaki et al. ............................. 123/295
5,127,378  7/1992  Ito ....................................... 123/305 X
5,313,920  5/1994  Matsushita ........................... 123/300 X

FOREIGN PATENT DOCUMENTS 59-37236  2/1984  Japan .

Primary Examiner—Tony M. Argenbright
Attorney, Agent, or Firm—Foley & Lardner

[57]  ABSTRACT

A fuel injection control system for a cylinder direct injection spark-ignition internal combustion engine judges a homogeneous charge combustion condition which requires homogeneous charge combustion and a stratified charge combustion condition which requires stratified charge combustion, in accordance with an engine operating condition. Fuel is supplied on an intake stroke so as to form a rich equivalent ratio in the homogeneous charge combustion, and fuel is supplied on a compression stroke so as to form a lean equivalent ratio in the stratified charge combustion, with the rich equivalent ratio being richer in fuel than the lean equivalent ratio. The system then gradually changes over an equivalent ratio within a range between the rich and lean equivalent ratios when engine operation is changed over between the homogeneous charge combustion condition and the stratified charge combustion condition. The system then injects first and second quantities of fuel into a cylinder of the engine respectively on intake and compression strokes in each cycle of the cylinder at least at a predetermined time during a time period in which the equivalent ratio is gradually changed over.

15 Claims, 8 Drawing Sheets

HOMOGENEOUS CH. COMBUSTION

STRATIFIED CH. COMBUSTION

FUEL INJECTION CONTROL SYSTEM FOR INTERNAL COMBUSTION ENGINE

The contents of Japanese Patent Application No. 9-176239, with a filing date of Jul. 1, 1997 in Japan, and of Japanese Patent Application No. 9-176240, with a filing date of Jul. 1, 1997 in Japan are hereby incorporated by reference.

BACKGROUND OF THE INVENTION

1. Field of the Invention

This invention relates to improvements in a cylinder direct injection spark-ignition internal combustion engine, and more particularly to a fuel injection control technique during a time at which combustion condition in a cylinder is changed over from homogeneous charge combustion to stratified charge combustion and vice versa.

2. Description of the Prior Art

In recent years, attention has been paid to cylinder direct injection spark-ignition internal combustion engines in which fuel is directly injected from a fuel injector valve into each cylinder of the engine. These engines are configured in general as follows: Combustion condition or manner in the cylinder is controlled to be changed over from homogeneous charge combustion to stratified charge combustion and vice versa. In the homogeneous charge combustion, fuel is injected on an intake stroke to spread fuel within a combustion chamber thereby to form a homogeneous air-fuel mixture (charge) in the cylinder. In the stratified charge combustion, fuel is injected on a compression stroke to concentrically form a layer of rich air-fuel mixture around a spark plug thereby to generate a stratified air-fuel mixture (charge) in the cylinder. An example of such engines is disclosed in Japanese Patent Provisional Publication No. 59-37236.

In connection with the above engines, it has been proposed to set a combustion region for accomplishing so-called weak stratified charge combustion between a combustion region for accomplishing stratified charge combustion and a combustion region for accomplishing homogeneous charge combustion, in a map having combustion regions which are set in accordance with engine speed and engine load (torque). In this weak stratified charge combustion region, two separate fuel injections are made respectively on intake and compression strokes in each cycle of the cylinder. This weak stratified charge combustion region is set for the following reasons: If the stratified charge combustion region and the homogeneous charge combustion region are set adjacent to each other upon equivalence ratio of the adjacent regions being continuous in order to prevent stepwise torque change during a time period in which changeover of stratified charge combustion and homogeneous charge combustion is carried out, the equivalence ratio becomes unsuitable for either one of stratified charge combustion and homogeneous charge combustion around the border between the stratified charge combustion region and the homogeneous charge combustion region. As a result, at a part (near the border) of the stratified charge combustion region, air-fuel mixture around a spark plug becomes excessively rich, thereby causing misfire while increasing smoke. At a part (near the border) of the homogeneous charge combustion region, the homogeneous air-fuel mixture becomes excessively lean, thereby causing misfire while making combustion unstable.

As discussed above, in the weak stratified charge combustion region between the stratified charge combustion region and the homogeneous charge combustion region, the two separate fuel injections are made respectively on intake and compression strokes while basically accomplishing stratified charge combustion upon suitably setting spark timing of the spark plug. This suppresses formation of an excessively rich air-fuel mixture around the spark plug and suppresses increase of smoke while suppressing misfire and occurrence of unstable combustion under homogeneous charge combustion.

However, drawbacks have been encountered in the above conventional engines because no allocation rates of fuel injection quantities respectively on intake and compression strokes have not been taken into consideration. For example, there will be the possibility that the fuel injection quantity (for stratified charge combustion) on the compression stroke becomes excessively large when the equivalence ratio is relatively large (rich) thereby providing the tendency of misfire occurring, and that the fuel injection quantity (for stratified charge combustion) becomes excessively small when the equivalence ratio is relatively small (lean) thereby providing the tendency of misfire occurring.

Additionally, in the above discussed engines, the two separate fuel injections are made by dividing a predetermined quantity of fuel into two portions in the weak stratified charge combustion region even under a steady state engine operating condition. This has raised the following problems: Dividing the predetermined quantity of fuel into the two portions decreases the quantity of fuel for each injection and therefore enlarges an offset error (a drift amount in a pulse width—fuel injection quantity characteristics) of the fuel injector valve. This lowers the precision of an air-fuel ratio control and deteriorates exhaust emission characteristics and drivability of the engine as compared with an engine in which only one fuel injection is made in each cycle of the cylinder.

Besides, since the fuel injection quantity on the intake stroke is small, homogeneous air-fuel mixture (charge) becomes excessively lean so that combustion flame is unavoidably extinguished in stratified charge combustion at lean air-fuel ratio, thereby increasing the amount of emission of hydrocarbons (unburned fuel). Particularly, when the two separate fuel injections are made in a low engine load operating range, combustible mixture is formed at the second fuel injection and therefore a large quantity of fuel cannot be injected at the first fuel injection, so that the homogeneous mixture becomes excessively lean.

Furthermore, the two separate fuel injections under the steady state engine operating condition increases the amount of heat generated in a drive unit for driving the fuel injector valve which is of the high voltage-boosting type, or increases production cost for the drive unit if the drive unit includes two systems for suppressing heat generation.

BRIEF SUMMARY OF THE INVENTION

It is an object of the present invention is to provide an improved fuel injection control system for a cylinder direct injection spark-ignition internal combustion engine, which can effectively overcome drawbacks encountered in conventional fuel injection control systems.

Another object of the present invention is to provide an improved fuel injection control system for a cylinder direct injection spark-ignition internal combustion engine, which can provide stable combustion in a cylinder, maintain a high precision in air-fuel ratio control and suppress occurrence of misfire in the cylinder and an increase of smoke.

A further object of the present invention is to provide an improved fuel injection control system for a cylinder direct injection spark-ignition internal combustion engine in which two separate fuel injections are made respectively on intake and compression strokes under a predetermined engine operating condition, in which respective fuel injection quantities on intake and compression strokes are appropriately allocated corresponding to an engine operating condition.

A still further object of the present invention is to provide an improved fuel injection control system for a cylinder direct injection spark-ignition internal combustion engine in which combustion condition in a cylinder is changed over from stratified charge combustion to homogeneous charge combustion and vice versa, in which control of equivalence ratio (in relation to air-fuel ratio) and two separate fuel injections are accomplished in combination when the changeover of the combustion condition is made.

An aspect of the present invention resides in a fuel injection control system for a cylinder direct injection spark-ignition internal combustion engine. The fuel injection control system comprises a section for regulating fuel to be injected into a cylinder of the engine so that first and second quantities of fuel are injected respectively on intake and compression strokes in each cycle of the cylinder under a predetermined engine operating condition, the first and second quantities corresponding respectively to first and second allocation rates of fuel. A section is provided to set the first and second allocation rates in accordance with air-fuel ratio of air-fuel mixture to be formed in the cylinder.

Another aspect of the present invention resides in a fuel injection control system for a cylinder direct injection spark-ignition internal combustion engine. The fuel injection control system comprises a section for judging as to whether a homogeneous charge combustion condition which requires homogeneous charge combustion and a stratified charge combustion condition which requires stratified charge combustion, in accordance with an engine operating condition. Fuel is supplied on intake stroke so as to form a rich equivalence ratio in the homogeneous charge combustion; and fuel is supplied on compression stroke so as to form a lean equivalence ratio in the stratified charge combustion, the rich equivalence ratio being richer in fuel than the lean equivalence ratio. A section is provided to gradually change over an equivalence ratio within a range between the rich and lean equivalence ratios when engine operation is changed over between the homogeneous charge combustion condition and the stratified charge combustion condition. A section is provided to inject first and second quantities of fuel into a cylinder of the engine respectively on intake and compression strokes in each cycle of the cylinder at least at a predetermined time during a time period in which the equivalence ratio is gradually changed.

A further aspect of the present invention resides in a fuel injection control system for a cylinder direct injection spark-ignition internal combustion engine. The fuel injection control system comprises a section for detecting an engine operating condition of the engine. A section is provided to calculate an equivalence ratio in accordance with the engine operating condition. A section is provided to regulate fuel to be injected into a cylinder of the engine so that first and second quantities of fuel are injected respectively on intake and compression strokes in each cycle of the cylinder. A section is provided to calculate first and second allocation rates which respectively correspond to the first and second quantities of fuel, in accordance with the equivalence ratio.

A still further aspect of the present invention resides in a fuel injection control system for a cylinder direct injection spark-ignition internal combustion engine. The fuel injection control system is configured to perform: (a) regulating fuel to be injected into a cylinder of the engine so that first and second quantities of fuel are injected respectively on intake and compression strokes in each cycle of the cylinder, the first and second quantities corresponding respectively to first and second allocation rates of fuel; and (b) setting the first and second allocation rates in accordance with air-fuel ratio of air-fuel mixture to be formed in the cylinder.

A still further aspect of the present invention resides in a fuel injection control system for a cylinder direct injection spark-ignition internal combustion engine. The fuel injection control system is configured to perform: (a) judging a homogeneous charge combustion condition which requires homogeneous charge combustion and a stratified charge combustion condition which requires stratified charge combustion, in accordance with an engine operating condition, fuel being supplied on intake stroke so as to form a rich equivalence ratio in the homogeneous charge combustion, fuel being supplied on compression stroke so as to form a lean equivalence ratio in the stratified charge combustion, the rich equivalence ratio being richer in fuel than the lean equivalence ratio; (b) gradually changing over an equivalence ratio within a range between the rich and lean equivalence ratios when engine operation is changed over between the homogeneous charge combustion condition and the stratified charge combustion condition; and (c) injecting first and second quantities of fuel into a cylinder of the engine respectively on intake and compression strokes in each cycle of the cylinder at least at a predetermined time during a time period in which the equivalence ratio is gradually changed over.

According to the present invention, the fuel injection quantities on intake and compression strokes are allocated in accordance with equivalence ratio in relation to air-fuel ratio, in the predetermined engine operating condition. Consequently, air-fuel mixtures having appropriate air-fuel ratios are formed respectively in an inner space around a spark plug and an outer space surrounding the inner space, thereby extending limits of combustion at an equivalence ratio, thus preventing occurrence of misfire and unstable combustion in the cylinder.

More specifically, judgment is made such that the present engine operation lies in the homogeneous charge combustion condition or in the stratified charge combustion condition, in accordance with the engine operating condition, for example, engine speed and engine load. When the present engine operation is judged to be changed over from the homogeneous charge combustion condition to the stratified charge combustion condition and vice versa, the relatively rich equivalence ratio in the homogeneous charge combustion condition is gradually changed over to the relatively lean equivalence ratio in the stratified charge combustion and vice versa, using a relatively long time. As a result of the gradual changeover of combustion condition, stepwise torque change can be prevented from occurring between homogeneous charge combustion and stratified charge combustion, and therefore a combustion region of homogeneous charge combustion and a region of stratified charge combustion can be to each other upon making a difference in equivalent ratio between the homogeneous charge combustion region and the stratified charge combustion region. Consequently, stable combustion can be accomplished near the border of the homogeneous charge combustion region and the stratified charge combustion region, thereby maintaining a high precision in air-fuel ratio control while effectively suppressing occurrence of misfire and an increase of smoke.

At a transient time in which the equivalence equivalent ratio is changed over, fuel is divided and injected both on the intake stroke and the compression stroke. Consequently, the air-fuel ratio of air-fuel mixture around the spark plug can be maintained at a suitably rich condition, while homogeneous air-fuel mixture is formed around such rich air-fuel mixture. This extends the limits of combustion at an air-fuel ratio, thereby realizing stable combustion while preventing occurrence of misfire.

Besides, even if there is the possibility of the homogeneous air-fuel mixture formed by fuel injection on intake stroke during the two separate fuel injections becoming excessively lean, such formation of the excessively lean mixture occurs only temporarily so as not to contribute to an increase in emission of unburned hydrocarbons. This temporary divided two times fuel injections can suppress an increase in heat generation of the drive unit for the fuel injector valve, and makes it unnecessary to provide dual systems of the high voltage-boosting type drive unit for the fuel injector valve thereby allowing use of a low cost drive unit for the fuel injector valve.

DETAILED DESCRIPTION OF THE INVENTION

Figure 1:
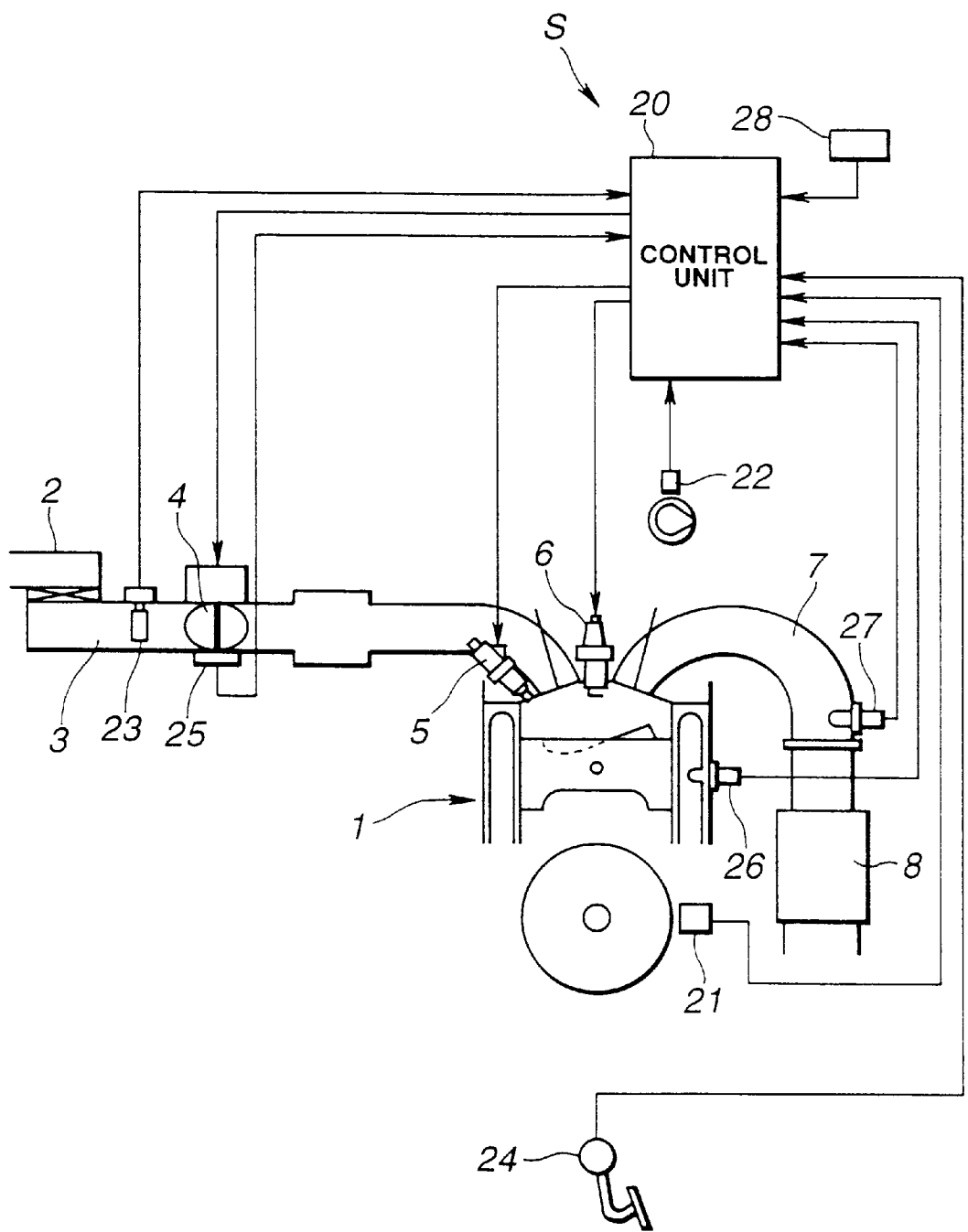
FIG. 1 is a schematic illustration of a cylinder direct injection spark-ignition internal combustion engine equipped with an embodiment of a fuel injection control system according to the present invention.
Figure 2:
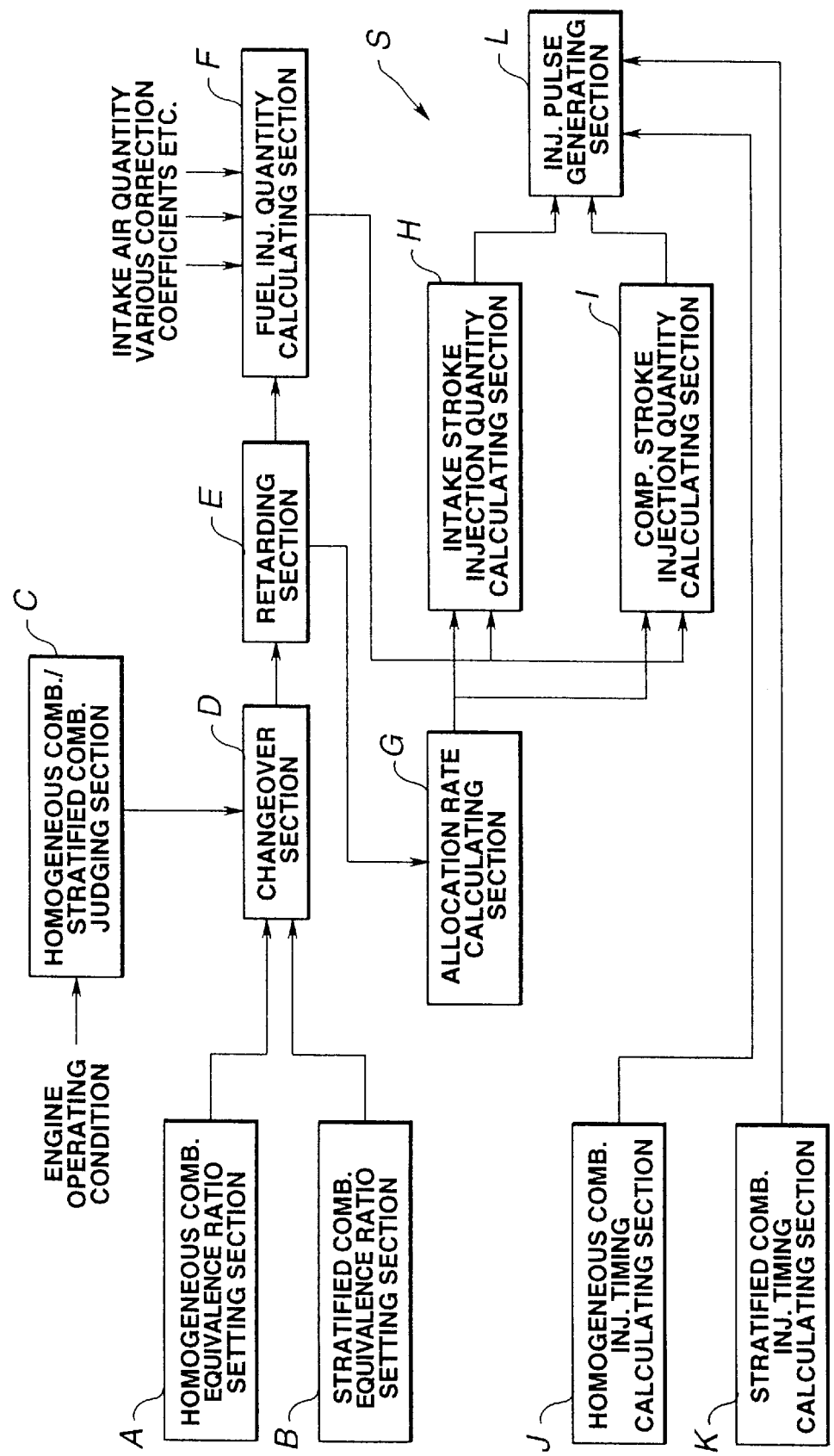
FIG. 2 is a block diagram showing function of the fuel injection control system of FIG. 1.

Referring now to FIG. 1 of the drawings, an embodiment of a fuel injection control system according to the present invention is illustrated by the reference character S. The fuel injection control system S of this embodiment is for a cylinder direct injection spark-ignition internal combustion engine of an automotive vehicle. The engine comprises an engine main body 1 mounted on a vehicle body (not shown). The engine main body 1 has a plurality of cylinders each of which is supplied with air through an intake air passage 3 from an air filter 2 under control of an electronically controlled throttle valve 4. A combustion chamber (not identified) is defined in each cylinder. The throttle valve 4 is operated such that its opening degree is controlled in accordance with a signal from a control unit 20 under the action of a step motor or the like. An electromagnetically controlled fuel injector valve 5 is disposed to the combustion chamber so as to directly inject fuel (gasoline) into the combustion chamber. The fuel injector valve 5 is arranged to inject fuel (pressure-regulated to have a predetermined pressure) in accordance with an injection pulse signal which is output from the control unit 20 in timed relation to engine revolution in intake stroke or/and in compression stroke of each cylinder. The fuel injector valve 5 is opened to accomplish such fuel injection upon a solenoid of the fuel injector valve 5 being energized.

The injected fuel from the fuel injector valve 5 is spread in the combustion chamber to form a homogeneous air-fuel mixture in the combustion chamber, in the case of fuel injection in an intake stroke of the cylinder. The injected fuel from the fuel injector valve 5 is concentrated around a spark plug 6 to form a stratified air-fuel mixture in the combustion chamber, in the case of fuel injection in a compression stroke of the cylinder. Such air-fuel mixture is ignited by the spark plug 6 and in accordance with an ignition signal output from the control unit 20 thereby accomplishing homogeneous charge combustion or stratified charge combustion. More specifically, the homogeneous charge combustion includes homogeneous charge combustion at stoichiometric air-fuel ratio, and homogeneous charge combustion at lean air-fuel ratio (20:1 to 30:1). The stratified charge combustion includes stratified charge combustion at lean air-fuel ratio (about 40:1). The engine main body 1 is provided with an exhaust gas passage 7 through which exhaust gas from each cylinder is discharged. A catalytic converter 8 is disposed in the exhaust gas passage 7 to purify exhaust gas.

The control unit 20 includes a microcomputer having a CPU, a ROM, a RAM, a A/D converter, input and output interfaces and the like. A variety of sensors are provided to output signals which are to be input to the control unit 20. Such sensors will be discussed. A crankangle sensor 21 is provided to detect a rotational angle of a crankshaft (not identified) of the engine main body 1, and another crankangle sensor 22 is provided to detect a rotational angle of a camshaft (not identified). These crankangle sensors 21, 22 are adapted to output a standard pulse signal REF every crankangle of 720°/n (n=number of the cylinders) at a predetermined crankangle (a predetermined crankangle position before top dead center in compression stroke of each cylinder), and a unit pulse signal POS every crankangle of 1 to 2°. It will be understood that an engine speed Ne of the engine main body 1 can be calculated in accordance with a cycle or the like of the standard pulse signal REF.

An airflow meter 23 is disposed in the intake air passage 3 upstream of the throttle valve 4 so as to detect an intake air quantity Qa (a quantity of intake air to be introduced to the cylinders). An accelerator sensor 24 is provided to detect an accelerator operation amount ACC or depression amount of an accelerator pedal (not identified) of the vehicle. A throttle position sensor 25 is provided to detect an opening degree TVO of the throttle valve 4, and includes an idle switch (not identified) which is switched ON at a fully closed position of the throttle valve 4. An engine coolant temperature sensor 26 is provided to detect a temperature Tw of engine coolant. An oxygen ($O_2$) sensor 27 is disposed in the exhaust gas passage 7 so as to output a signal depending upon a rich mixture (low oxygen content in exhaust gas) or a lean mixture (high oxygen content in exhaust gas), i.e., depending upon the oxygen content in exhaust gas in the exhaust gas passage 7. The oxygen content represents (actual) air-fuel ratio of air-fuel mixture in the combustion chamber or in the cylinder.

Here, control unit 20 functions to input the signal from the above-mentioned sensors and makes predetermined calculation processing under the action of the microcomputer, and output a variety of command signals which control the opening degree of the electronically controlled throttle valve 4, a fuel injection quantity (a quantity of fuel to be injected to the combustion chamber) of the fuel injector valve 5, and a spark timing of the spark plug 6.

A control function of the embodiment of the fuel injection control system S during a time of combustion condition changeover will be discussed with reference to FIG. 3.

A homogeneous combustion equivalence ratio setting section A is provided to set an equivalence ratio (stoichiometric air-fuel ratio/actual air-fuel ratio) during homogeneous charge combustion, in accordance with an engine operating condition such as the engine speed, engine load and/or the like. It will be understood that the equivalence ratio is in close relation to the actual air-fuel ratio of air-fuel mixture in the combustion chamber.

A stratified combustion equivalence ratio setting section B is provided to set the equivalence ratio during stratified charge combustion, in accordance with an engine operating condition such as the engine speed, the engine load and/or the like.

A homogeneous combustion/stratified combustion judging section C is provided to make a judgement as to which one of homogeneous charge combustion and stratified charge combustion is to be carried out, in accordance with the engine operating condition.

A changeover section D is provided to change over the equivalence ratio from one set by the homogeneous combustion equivalence ratio setting section A to one set by the stratified combustion equivalence ratio, and vice versa so as to set the equivalence ratio in accordance with a judgment result of the homogeneous combustion/stratified combustion judging section C. The thus set equivalence ratio is output.

A retarding section E is provided to apply a delay processing onto the equivalence ratio output from the changeover section D. The delay processing is applied for the following reasons: If the equivalence ratio is changed over stepwise in accordance with changeover of combustion condition, a stepwise torque change occurs owing to delay of change in intake air quantity after the changeover action for intake air quantity. In view of this, under the action of this retarding section E, the equivalence ratio is gradually changed corresponding to the delay of change in intake air quantity thereby to allow engine torque to smoothly vary.

A fuel injection quantity calculating section F is provided to calculate a fuel injection quantity basically in accordance with the intake air quantity, the engine speed and the equivalence ratio to which the delay processing has been applied, thus to obtain a basic value of the fuel injection quantity. The thus obtained fuel injection quantity basic value is corrected with the engine coolant temperature, an equivalence ratio correction coefficient, and the like, thus obtaining the fuel injection quantity.

An allocation rate calculating section G is provided to calculate an allocation rate at which a first fuel injection quantity (for homogeneous charge combustion) of fuel is injected in the intake stroke and an allocation rate at which a second fuel injection quantity (for stratified charge combustion) of fuel is injected in the compression stroke when the changeover in the combustion condition (homogeneous charge combustion or stratified charge combustion) is being made, in accordance with either one of the equivalence ratio at the changeover section D and the equivalence ratio at the retarding section E.

An intake stroke injection quantity calculating section H and a compression stroke injection quantity calculating section I are provided to divide the fuel injection quantity (or a total fuel injection quantity for each stroke of a piston in the cylinder) calculated by the fuel injection quantity calculating section F into the first fuel injection quantity and the second fuel injection quantity, in accordance with the allocation rates calculated by the allocation rate calculating section G. In other words, the intake stroke injection quantity calculating section H and the compression stroke injection quantity calculating section I calculate the first fuel injection quantity and the second fuel injection quantity, respectively. The first fuel injection quantity is on the intake stroke, while the second fuel injection quantity is on the compression stroke.

A homogeneous combustion injection timing calculating section J is provided to calculate a fuel injection timing (or a timing at which fuel is injected from the fuel injector valve 5) during homogeneous charge combustion.

A stratified combustion injection timing calculating section K is provided to calculate the fuel injection timing during stratified charge combustion.

An injection pulse generating section L is provided to generate a fuel injection pulse (or a pulse-width time for which the fuel injector valve is opened to inject fuel) having a pulse width corresponding to the fuel injection quantity on the intake stroke, at the fuel injection timing for homogeneous charge combustion calculated by the homogeneous combustion injection timing calculating section J, and similarly to generate a fuel injection pulse having a pulse width corresponding to the fuel injection quantity on the compression stroke, at a fuel injection timing for stratified charge combustion calculated by the stratified combustion injection timing calculating section K.

Under the action of the above sections, during the combustion condition changeover time, two separate times (first and second fuel injections) of fuel injection are carried out respectively on intake and compression strokes. The first and second fuel injection quantities respectively at the first and second fuel injections are divided respectively at the above-mentioned allocation rate.

Figure 3:
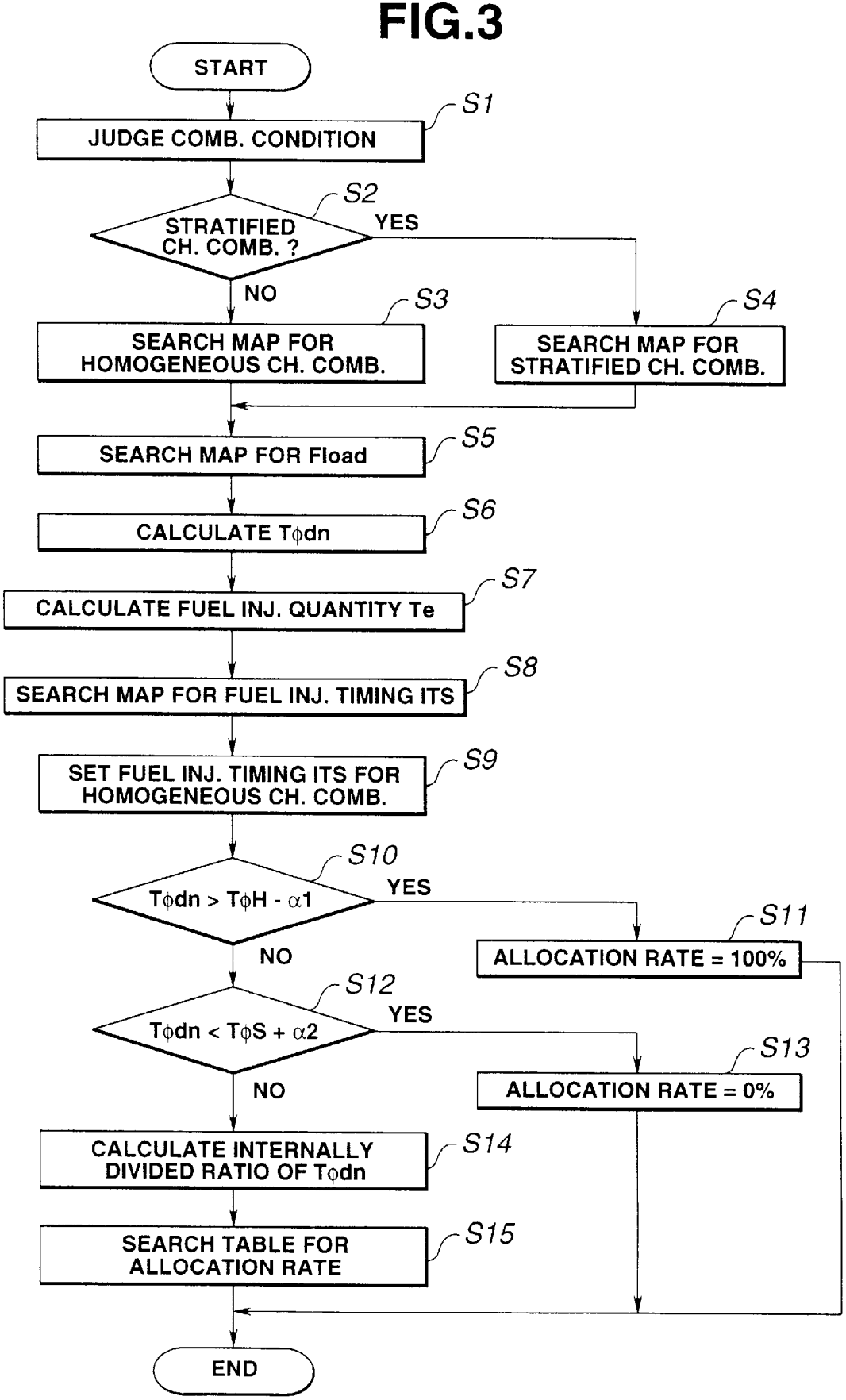
FIG. 3 is a flowchart of a routine for calculating allocation rates of fuel injection quantities on intake and compression strokes of a cylinder during a time period in which two separates fuel injections are made, in connection with the fuel injection control system of FIG. 1.
Figure 4:
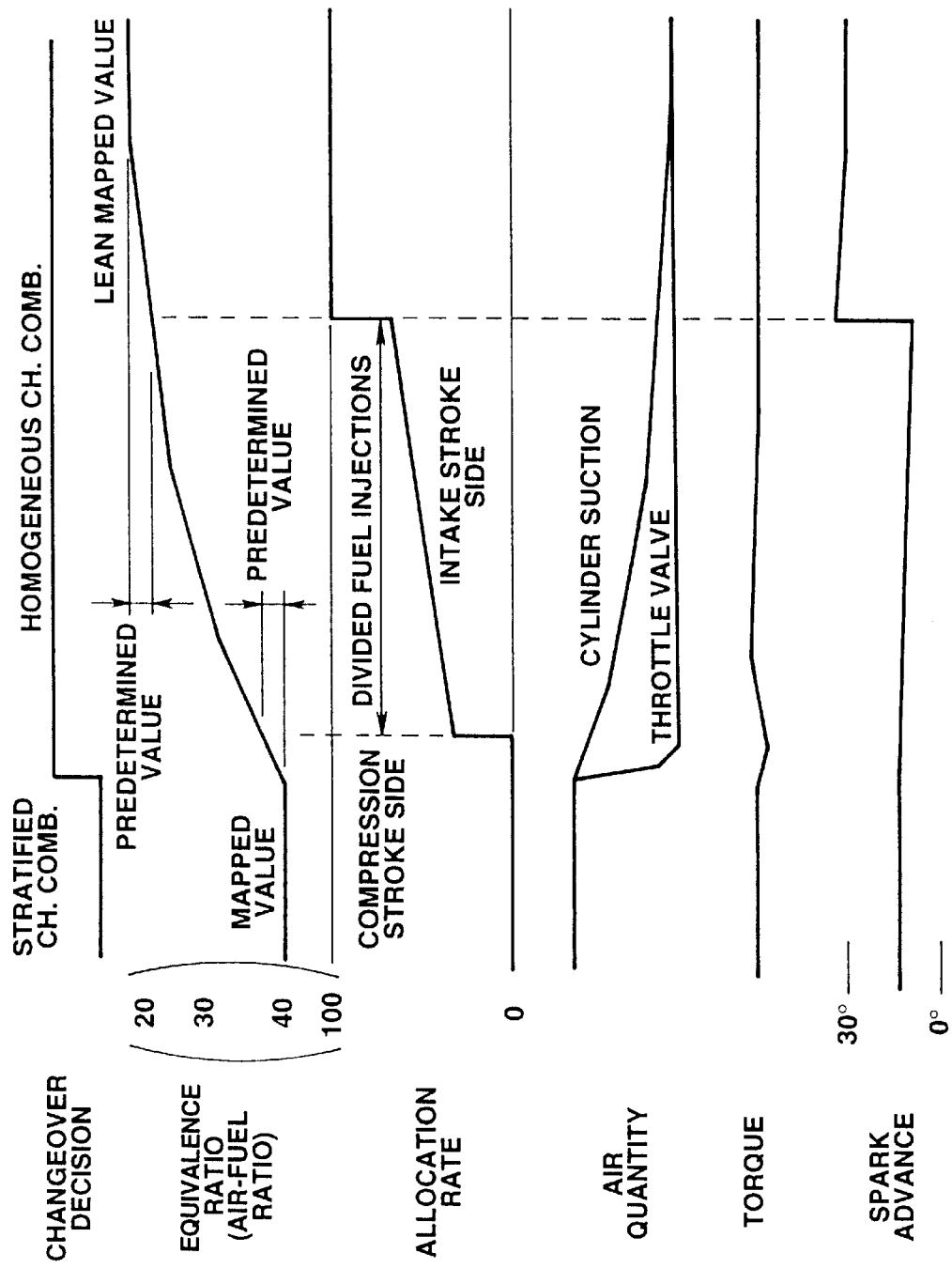
FIG. 4 is a time chart showing changes of a variety of control parameters during a time period in which a combustion condition is changed over from stratified charge combustion to homogeneous charge combustion, in connection with the fuel injection control system of FIG. 1.

Next, a routine for setting allocations rates of the fuel injection quantities is discussed with a flowchart of FIG. 3 and a time chart of FIG. 4. This routine is repeatedly executed at a predetermined time, interval, for example, 10 ms.

At a step 1, either one of stratified charge combustion and homogeneous charge combustion is selected in accordance with the engine operating condition such as engine speed, engine load and/or the like (at the homogeneous combustion/stratified combustion judging section C). In other words, at this step, a homogeneous charge combustion condition which requires homogeneous charge combustion or a stratified charge combustion condition which requires stratified charge combustion is judged in accordance with the engine operating condition.

At a step S2, a judgement is made as to which one of homogeneous and stratified charge combustions is selected (at the changeover section D).

In case that stratified charge combustion has been selected at the step 2, flow goes to a step S3 at which the equivalence ratio for stratified charge combustion is calculated, for example, by searching a map (at the stratified combustion equivalence ratio setting section B).

In the case that homogeneous charge combustion has been selected at the step S2, flow goes to a step S4 at which the equivalence ratio for homogeneous charge combustion is calculated, for example, by searching a map (at the homogeneous combustion equivalence ratio setting section A).

Figure 5:
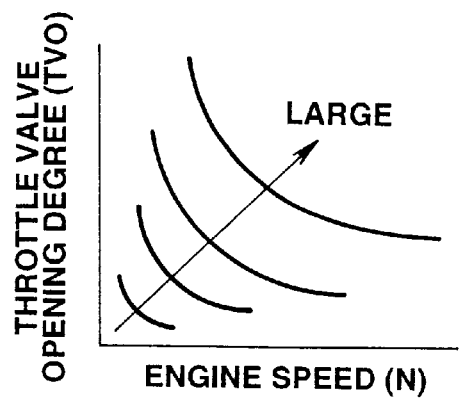
FIG. 5 is a graph showing a map in which weighting for calculation of weighted average is set in terms of throttle valve opening degree and engine speed, in connection with the fuel injection control system of FIG. 1.

At a step S5, calculation is made to obtain a weight Fload to a present value of a weighted average used in the delay processing for the calculated equivalence ratio, for example, by searching a map (as shown in FIG. 5) in accordance with the engine operating condition such as engine speed and the throttle valve opening degree TVO.

At a step S6, the weighted average is made to the equivalence ratio $T\phi$ using the weight Fload, according to the following equation thereby accomplishing the delay processing:

$$T\phi dn = T\phi n \times Fload + T\phi dn - 1 \times (1 - Fload)$$

For example, when the combustion condition is changed over from stratified charge combustion to homogeneous charge combustion, the equivalence ratio is gradually increased from a mapped value under the delay processing so as to approach a target value (equivalence ratio) for the homogeneous charge combustion.

Turning to FIG. 3, at a step S7, the fuel injection quantity Te is calculated according to the following equation (at the fuel injection quantity calculating section F):

$$Te = Tp \times T\phi d \times Ktr \times Ktw \times Kas \times (\alpha + \alpha m)$$

where Tp is a basic fuel injection quantity (=kQ/N where k is a constant) is obtained in accordance with the intake air quantity Q (detected by the airflow meter 23) and the engine speed N; Ktr is a transient correction coefficient; Ktw is a coolant temperature correction coefficient; Kas is a correction coefficient for increasing the fuel injection quantity after engine starting; $\alpha$ is an air-fuel ratio feedback correction coefficient; and $\alpha m$ is a learned value of the air-fuel ratio feedback correction coefficient $\alpha$.

Figure 6:
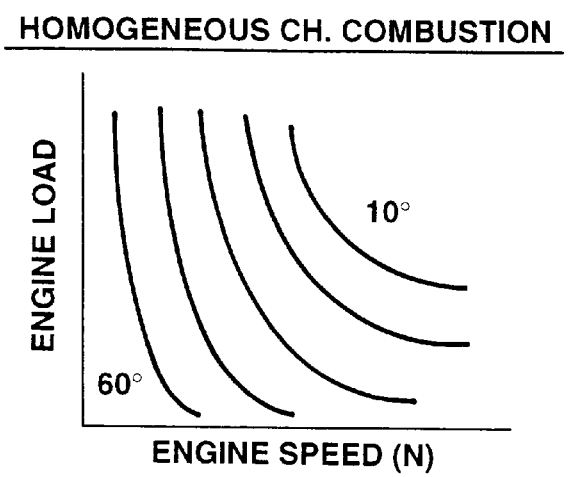
FIG. 6 is a graph showing a map in which spark timing for homogeneous charge combustion is set in terms of engine load and engine speed, in connection with the fuel injection control system of FIG. 1.
Figure 7:
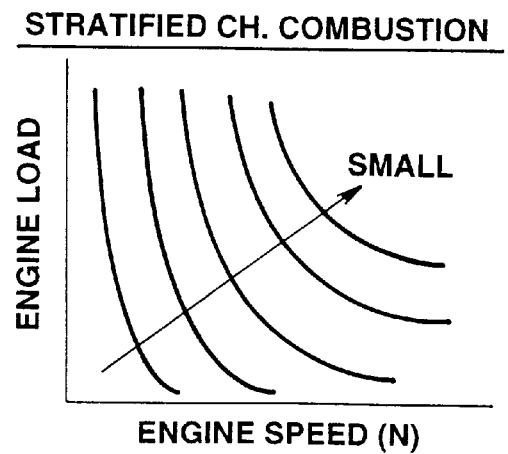
FIG. 7 is a graph showing a map in which spark timing for stratified charge combustion is set in terms of engine load and engine speed, in connection with the fuel injection system of FIG. 1.

At a step S8, the fuel injection timing ITS for stratified charge combustion and the fuel injection timing ITS for homogeneous charge combustion are calculated, for example, by searching a map (as shown in FIG. 6 or FIG. 7) for each of the homogeneous and stratified charge combustions, in accordance with the engine speed N and the engine load.

At a step S9, the fuel injection timing ITS for homogeneous charge combustion is set.

At a step S10, a judgement is made as to whether the above-mentioned equivalence ratio $T\phi dn$ obtained under the delay processing is larger or not than a decision value for changeover to homogeneous charge combustion which decision value is smaller by a predetermined value $\alpha 1$ than a lower limit value $T\phi H$ for homogeneous charge combustion. When the equivalence ratio $T\phi dn$ is judged to be larger than the decision value, the flow goes to a step S11 at which the allocation rate for homogeneous charge combustion is set at 100% while the allocation rate for stratified charge combustion is set at 0%, so that the entire fuel injection quantity Te calculated at the step S7 is injected on the intake stroke of the piston, thereby accomplishing complete homogeneous charge combustion.

When the equivalence ratio $T\phi dn$ is judged to be not larger than the decision value for changeover to homogeneous charge combustion, the flow goes to a step S12 at which the equivalence ratio $T\phi d$ is evaluated to determine if it is smaller than a decision value for changeover to stratified charge combustion, where that decision value is larger by a predetermined value $\alpha 2$ than an upper limit value $T\phi S$ for stratified charge combustion. When the equivalence ratio $T\phi dn$ is judged to be smaller than the decision value, the flow goes to a step S13 at which the allocation rate for the homogeneous charge combustion is set at 0% while the allocation rate for the stratified charge combustion is set at 100%, so that the entire fuel injection quantity Te calculated at the step S7 is injected on the compression stroke of the piston, thereby accomplishing complete stratified charge combustion.

When the equivalence ratio $T\phi dn$ is judged to be smaller than the decision value for changeover to stratified charge combustion (i.e., in case of the equivalence ratio $T\phi dn$ being within a range of $[T\phi S + \alpha < T\phi d < T\phi H - \alpha 1]$ at the step S12, the following decision is made: the present status has corresponded to the combustion condition changeover time of the present invention so that two separate fuel injections are to be made respectively on intake and compression strokes. Then, the flow goes to a step S14 in which the two separate fuel injections are accomplished.

At the step S14, the equivalence ratio $T\phi dn$ is internally divided by the lower limit value $T\phi S$ (for stratified charge combustion) and the upper limit value $T\phi H$ (for homogeneous charge combustion), thereby to obtain an internally divided ratio, according to the following equation:

Internally divided ratio of $T\phi dn = (T\phi dn - T\phi S)/(T\phi H - T\phi S)$ It will be understood that the equivalence ratio $T\phi dn$ may be internally divided by the decision value ($T\phi S + \alpha 2$) for changeover to stratified charge combustion and the decision value ($T\phi H - \alpha 1$) so as to obtain the internally divided ratio (=0 to 1).

Figure 8A:
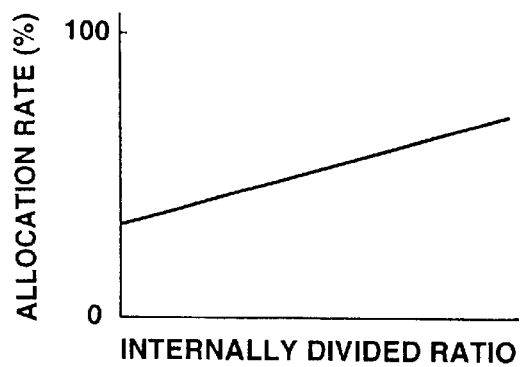
FIG. 8A is a graph showing a map in which the allocation rate of homogeneous charge combustion is set in terms of the internally divided ratio, in connection with the fuel injection system of FIG. 1.
Figure 8B:
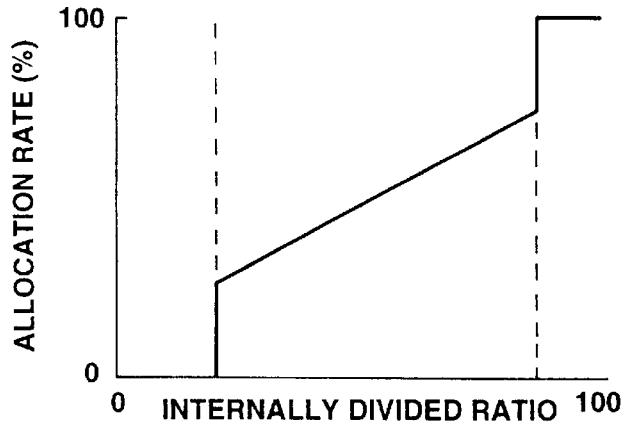
FIG. 8B is a graph showing a map similar to that of FIG. 8A but sets therein the allocation rate of homogeneous charge combustion in terms of the internally divided ratio, upon taking the combustion condition into consideration.
Figure 8C:
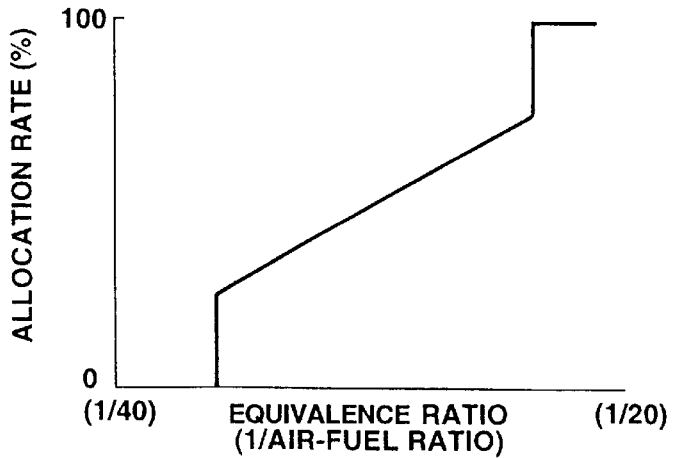
FIG. 8C is a graph showing a map similar to that of FIG. 8B but sets therein the allocation rate of homogeneous charge combustion in terms of the deviation in equivalence ratio from stratified charge combustion and homogeneous charge combustion.

At a step S15, the allocation rate (of fuel injection quantity) for homogeneous charge combustion is searched from a table shown in FIG. 8A, in accordance with the above internally divided ratio $T\phi dn$. The allocation rate of fuel injection quantity increases with an increase in the equivalence ratio $T\phi dn$, in which the allocation rate is set within a range of from a minimum value larger a considerable amount than 0% to a maximum value smaller a considerable amount than 100%. This is because precision of the fuel injection quantity of fuel from the fuel injector valve 5 cannot be maintained at a suitable value if the fuel injection quantity becomes too small. The table in FIG. 8A may be replaced with a table shown in FIG. 8B, which has been set upon taking regions of stratified charge combustion and homogeneous charge combustion. Further, the table in FIG. 8A may be replaced with a table shown in FIG. 8C, which sets the allocation rate in terms of deviation in equivalent ratio from stratified charge combustion and homogeneous charge combustion. Here, it is preferable to use values searched from a map as the equivalence ratios in the stratified charge combustion and homogeneous charge combustion; however, standard equivalence ratios may be conveniently used.

Thus, according to the above embodiment, the divided fuel quantities to be injected respectively on intake and compression strokes are allocated in accordance with the allocation rate which is calculated in accordance with the equivalence ratio, and therefore the fuel quantities can be appropriately allocated in accordance with the equivalence ratio, thereby effectively preventing misfire and unstable combustion while extending limits of combustion at the equivalence ratio.

During a time period in which the equivalence ratio is gradually changed over, divided injections of fuel are accomplished thereby stabilizing combustibility of fuel during this time so as to effectively prevent occurrence of misfire in the cylinder. Particularly, in this embodiment, the time duration in which the divided injections of fuel are carried out is set within a range of the equivalence ratio, and more specifically within a range of the equivalence ratio which range has the predetermined deviations from the equivalence ratios at times before and after the combustion condition changeover. This prevents air-fuel ratio in the cylinder from becoming excessively rich or excessively lean, thereby ensuring stable combustion in the cylinder. Additionally, when combustion condition is changed from stratified charge combustion into homogeneous charge combustion at stoichiometric air-fuel ratio upon application of load of an air conditioner in the automotive vehicle, the deviations from the equivalence ratio (=1) corresponding to the stoichiometric air-fuel ratio are set in accordance with engine speed. This is because the equivalence ratio for lean limit in homogeneous charge combustion is decided in accordance with engine speed.

When the combustion condition changeover is accomplished, the opening degree of the throttle valve 4 is controlled in accordance with the decision of the combustion changeover. For example, in an example shown in FIG. 4, the throttle valve opening degree is controlled to decrease upon decision of the combustion condition changeover. In accordance with this controlled throttle valve opening degree, the intake air quantity of air to be supplied to the cylinder gradually changes (gradually decreases in the example shown in FIG. 4). Engine torque is maintained at an approximately constant level under control in which the equivalence ratio is gradually changed according to delay of change in intake air quantity. Additionally, spark timing (spark advance angle) for the spark plug 6 is gradually changed in accordance with a change in the equivalence ratio while being set corresponding to stratified charge combustion since stratified charge combustion is basically carried out during the time in which the divided fuel injection is made. For example, in the example shown in FIG. 4, the spark timing is gradually retarded as the combustion condition changeover comes near. Then, the spark timing is changed stepwise in timed relation to the changeover from the divided fuel injection to a single fuel injection for homogeneous charge combustion, in which the spark timing is advanced when the changeover is made to homogeneous charge combustion. During a time period in which the equivalence ratio is being changed under homogeneous charge combustion, the spark timing is controlled to gradually change.

Figure 9:
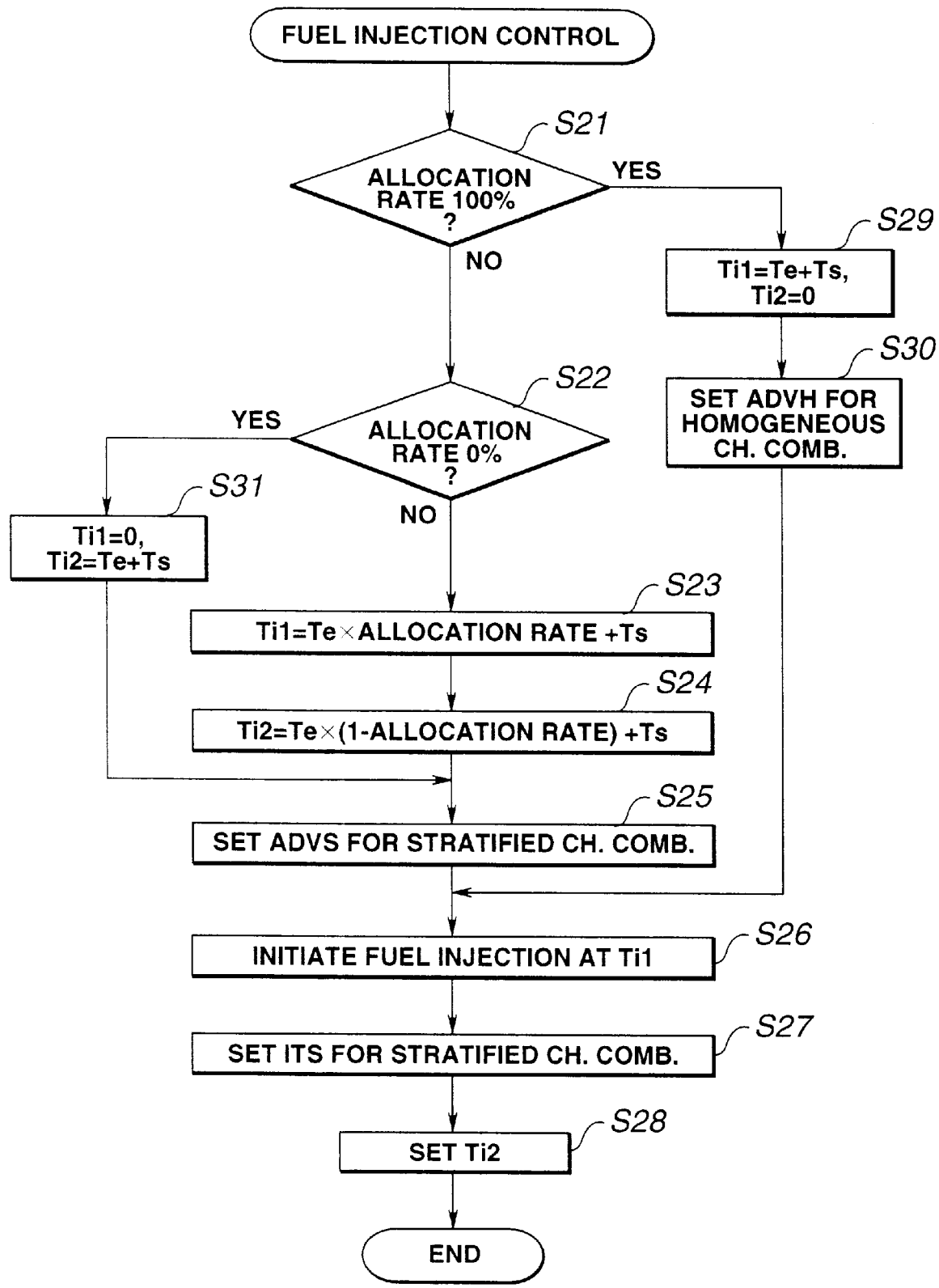
FIG. 9 is a flowchart of a routine for fuel injection control, in connection with the fuel injection control system of FIG. 1.
Figure 10:
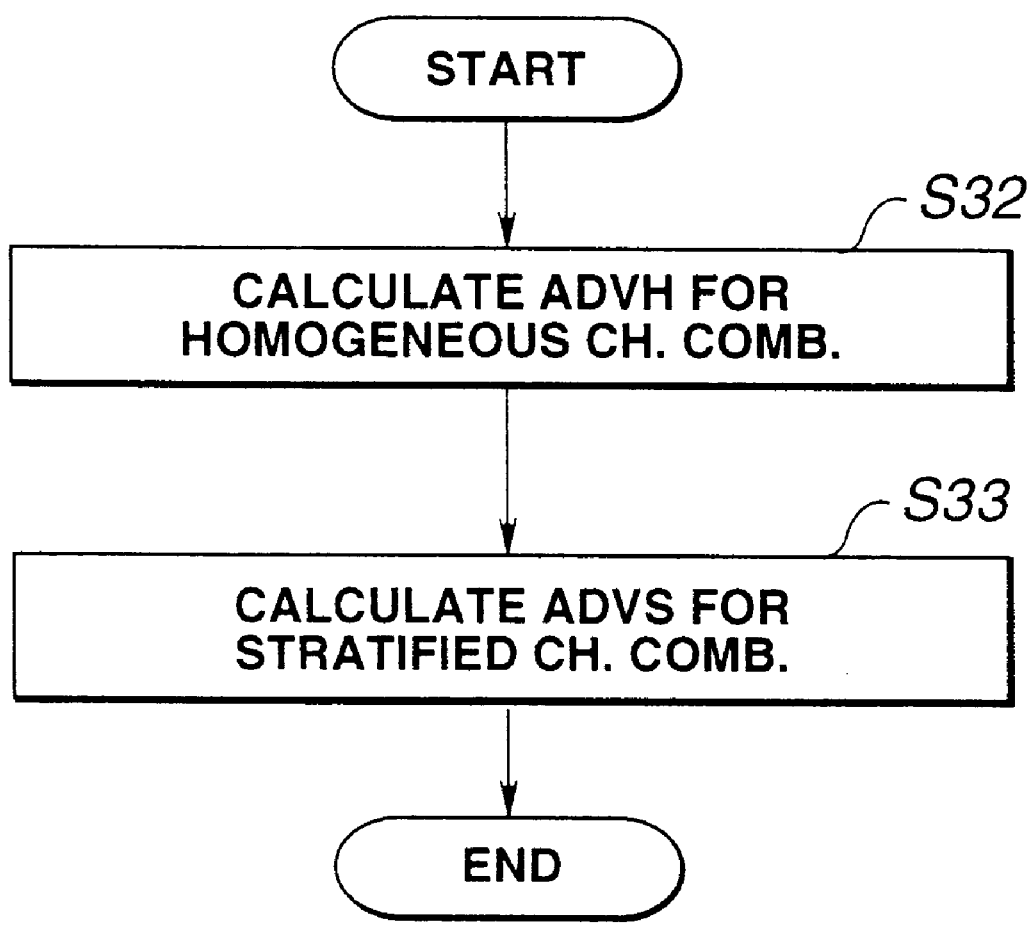
FIG. 10 is a flowchart of a routine for calculating spark timing in connection with the engine of FIG. 1.

Next, a fuel injection control routine will be discussed with reference to a flowchart of FIG. 9. The fuel injection control routine is executed in accordance with the allocation rate of the fuel injection quantity. This routine is executed when the fuel injection timing ITS for homogeneous charge combustion has occurred.

At a step S21, judgment is made as to whether the abovementioned allocation rate is 100% or not. In case of being not 100%, a flow goes to a step S22 at which judgment is made as to whether the allocation rate is 0% or not. In case of being not 0%, the divided (two separate) fuel injection is to be accomplished and therefore the flow goes to a step S23.

At the step S23, the fuel injection quantity (the pulse width to be output to the fuel injector valve) Ti1 is calculated by the following equation:

$$Ti1 = Te \times \text{allocation rate} + Ts$$

where Ts is an ineffective injection amount required to put the fuel injector valve from its closed state to its open state.

At a step S24, a fuel injection quantity Ti2 on compression stroke is calculated by the following equation:

$$Ti2 = Te \times (1 - \text{allocation rate}) + Ts$$

Subsequently, the flow goes to a step 25 at which a spark timing ADVS which has been calculated according to a separate spark timing calculation routine is set. This spark timing ADVS is for stratified charge combustion since the combustion condition in case that the two separate fuel injections are carried out is basically stratified charge combustion.

At a step S26, fuel injection at the fuel injection quantity Ti1 is initiated at the fuel injection timing ITH on intake stroke.

At a step S27, the fuel injection timing ITS for stratified charge combustion is set.

At a step S28, the fuel injection quantity Ti2 on the compression stroke is set.

As a result, fuel injection at the fuel injection quantity Ti2 is initiated at the fuel injection timing ITS for stratified charge combustion on the compression stroke.

In case that the allocation rate is judged to be 100% at the step S21, complete homogeneous charge combustion is to be carried out and therefore the flow goes to a step S29 at which the fuel injection quantity Ti1 (for homogeneous charge combustion) of fuel to be injected on intake stroke is calculated while the fuel injection quantity Ti2 (for stratified charge combustion) of fuel to be injected on the compression stroke is set at 0, as indicated by the following formulae:

$$Ti1 = Te \ (\times 100\%) + Ts$$

$$Ti2 = 0$$

Subsequently, the flow goes to a step S30, a spark timing ADVH (for homogeneous charge combustion) which has been calculated according to a separate spark timing calculation routine is set. Thereafter, the flow goes to a step S25. As a result, spark ignition is made at the spark timing ADVH thereby to accomplish homogeneous charge combustion.

In the case that the allocation rate is judged to be 0% at the step S22, complete stratified charge combustion is to be carried out and therefore the flow goes to a step S31 at which the fuel injection quantity Ti1 (for stratified charge combustion) of fuel to be injected on intake stroke is set at 0 while the fuel injection quantity Ti2 (for stratified charge combustion) of fuel to be injected on the compression stroke is calculated, as indicated by the following formulae:

Ti1=0

Ti2=Te (×100%)+Ts

Subsequently, the flow goes to the step S25 at which a spark timing ADVS (for stratified charge combustion) is set, and thereafter spark ignition is made at the spark timing ADVS thereby to accomplish stratified charge combustion.

FIG. 11 shows the spark timing calculation routine which is to be executed at intervals of a predetermined time (for example, 10 ms). At a step S32, the spark timing ADVH (for homogeneous charge combustion) is calculated in accordance with the engine operating condition, for example, engine speed N and engine load such as the basic fuel injection quantity Tp. At a step S33, the spark timing ADVS (for stratified charge combustion) is calculated similarly to at the step S32.

What is claimed is:

1. A fuel injection control system for a cylinder direct injection spark-ignition internal combustion engine, comprising:

a section for regulating fuel to be injected into a cylinder of the engine so that first and second quantities of fuel are injected respectively on intake and compression strokes in each cycle of the cylinder under a predetermined engine operating condition, said first and second quantities corresponding respectively to first and second allocation rates of fuel;

a section for setting said first and second allocation rates in accordance with air-fuel ratio of air-fuel mixture to be formed in the cylinder;

a section for judging a homogeneous charge combustion condition which requires homogeneous charge combustion and a stratified charge combustion condition which requires stratified charge combustion, in accordance with an engine operating condition, fuel being supplied on intake stroke so as to form a rich equivalence ratio in the homogeneous charge combustion, fuel being supplied on compression stroke so as to form a lean equivalence ratio in the stratified charge combustion, the rich equivalence ratio being richer in fuel than the lean equivalence ratio; and a section for gradually changing over an equivalence ratio within a range between the rich and lean equivalence ratios when engine operation is changed over between the homogeneous charge combustion condition and the stratified charge combustion condition;

wherein said fuel regulating section is arranged such that the first and second quantities of fuel are injected respectively on intake and compression at least at a predetermined time during a time period in which the equivalence ratio is gradually changed over.

2. A fuel injection control system as claimed in claim 1, wherein said fuel regulating section includes a section for injecting the first and second quantities of fuel respectively on intake and compression strokes during a time period between a first timing at which a requirement of changeover from stratified charge combustion to homogeneous charge combustion is generated and a second timing at which a spark timing of a spark plug is changed over to that corresponding to homogeneous charge combustion.

3. A fuel injection control system as claimed in claim 1, wherein said fuel regulating section includes a section for injecting the first and second quantities of fuel respectively on intake and compression strokes within a predetermined range of the equivalence ratio.

4. A fuel injection control system as claimed in claim 1, wherein said fuel regulating section includes a section for injecting the first and second quantities of fuel respectively on intake and compression strokes during a time period between a first timing at which the equivalence ratio which is gradually changed over has a deviation not smaller than a predetermined value, from the equivalent ratio in a timing before the engine operation is changed over and a second timing at which the equivalence ratio has a deviation not larger than a predetermined value, from the equivalence ratio in a timing after the engine operation is changed over.

5. A fuel injection control system as claimed in claim 1, further comprising a section for detecting the engine operating condition.

6. A fuel injection control system for a cylinder direct injection spark-ignition internal combustion engine, comprising:

a section for regulating fuel to be injected into a cylinder of the engine so that first and second quantities of fuel are injected respectively on intake and compression strokes in each cycle of the cylinder under a predetermined engine operating condition, said first and second quantities corresponding respectively to first and second allocation rates of fuel;

a section for setting said first and second allocation rates in accordance with air-fuel ratio of air-fuel mixture to be formed in the cylinder; and a section for calculating the first allocation rate so that the first allocation rate increases with an equivalence ratio.

7. A fuel injection control system for a cylinder direct injection spark-ignition internal combustion engine, comprising:

a section for regulating fuel to be injected into a cylinder of the engine so that first and second quantities of fuel are injected respectively on intake and compression strokes in each cycle of the cylinder under a predetermined engine operating condition, said first and second quantities corresponding respectively to first and second allocation rates of fuel;

a section for setting said first and second allocation rates in accordance with air-fuel ratio of air-fuel mixture to be formed in the cylinder; and a section for calculating each allocation rate in accordance with a deviation of a present equivalence ratio from an equivalence ratio in each of stratified charge combustion and homogeneous charge combustion.

8. A fuel injection control system for a cylinder direct injection spark-ignition internal combustion engine comprising:

a section for regulating fuel to be injected into a cylinder of the engine so that first and second quantities of fuel are injected respectively on intake and compression strokes in each cycle of the cylinder under a predetermined engine operating condition, said first and second quantities corresponding respectively to first and second allocation rates of fuel;

a section for setting said first and second allocation rates in accordance with air-fuel ratio of air-fuel mixture to be formed in the cylinder; and a section for calculating each allocation rate in accordance with an internally divided ratio of a present equivalence ratio relative to first and second equivalence ratios which are respectively for stratified charge combustion and homogeneous charge combustion.

9. A fuel injection control system as claimed in claim 8, wherein the first and second equivalence ratios are formed at a timing before or after a changeover is made between stratified charge combustion and homogeneous charge combustion.

10. A fuel injection control system as claimed in claim 8, further comprising a section for setting each predetermined value in accordance with engine speed of the engine, for the equivalence ratio corresponding to about stoichiometric air-fuel ratio when homogeneous charge combustion is at about stoichiometric air-fuel ratio.

11. A fuel injection control system for a cylinder direct injection spark-ignition internal combustion engine, comprising:
- a section for judging as to whether a homogeneous charge combustion condition which requires homogeneous charge combustion and a stratified charge combustion condition which requires stratified charge combustion, in accordance with an engine operating condition, fuel being supplied on intake stroke so as to form a rich equivalence ratio in the homogeneous charge combustion, fuel being supplied on compression stroke so as to form a lean equivalence ratio in the stratified charge combustion, the rich equivalence ratio being richer in fuel than the lean equivalence ratio;
- a section for gradually changing over an equivalence ratio within a range between the rich and lean equivalence ratios when engine operation is changed over between the homogeneous charge combustion condition and the stratified charge combustion condition; and
- a section for injecting first and second quantities of fuel into a cylinder of the engine respectively on intake and compression strokes in each cycle of the cylinder at least at a predetermined time during a time period in which the equivalence ratio is gradually changed.

12. A fuel injection control system for a cylinder direct injection spark-ignition internal combustion engine, comprising:
- a section for detecting an engine operating condition of the engine;
- a section for calculating an equivalence ratio in accordance with the engine operating condition;
- a section for regulating fuel to be injected into a cylinder of the engine so that first and second quantities of fuel are injected respectively on intake and compression strokes in each cycle of the cylinder; and
- a section for calculating first and second allocation rates which respectively correspond to the first and second quantities of fuel, in accordance with the equivalence ratio.

13. A fuel injection control system for a cylinder direct injection spark-ignition internal combustion engine, said fuel injection control system being configured to perform:
- judging a homogeneous charge combustion condition which requires homogeneous charge combustion and a stratified charge combustion condition which requires stratified charge combustion, in accordance with an engine operating condition, fuel being supplied on intake stroke so as to form a rich equivalence ratio in the homogeneous charge combustion, fuel being supplied on compression stroke so as to form a lean equivalence ratio in the stratified charge combustion, the rich equivalence ratio being richer in fuel than the lean equivalence ratio;
- gradually changing over an equivalence ratio within a range between the rich and lean equivalence ratios when engine operation is changed over between the homogeneous charge combustion condition and the stratified charge combustion condition; and
- injecting first and second quantities of fuel into a cylinder of the engine respectively on intake and compression strokes in each cycle of the cylinder at least at a predetermined time during a time period in which the equivalence ratio is gradually changed over.

14. A fuel injection control system for a cylinder direct injection spark-ignition internal combustion engine, comprising:
- a judging section for judging a homogeneous charge combustion condition which requires homogeneous charge combustion and a stratified charge combustion condition which requires stratified charge combustion, in accordance with an engine operating condition, fuel being supplied on an intake stroke so as to form a rich equivalence ratio in the homogeneous charge combustion, fuel being supplied on a compression stroke so as to form a lean equivalence ratio in the stratified charge combustion, the rich equivalence ratio being richer than the lean equivalence ratio;
- a regulating section for regulating fuel to be injected into a cylinder of the engine so that first and second quantities are injected respectively on the intake and compression strokes in each cycle under a predetermined engine operating condition, the first and second quantities corresponding respectively to first and second allocation rates of fuel;
- a setting section for setting the first and second allocation rates in accordance with an air-fuel ratio of an air-fuel mixture to be formed in the cylinder; and
- an equivalence ratio changing section for gradually changing over an equivalence ratio within a range between the rich and lean equivalence ratios when the engine operation is changed over between the homogeneous charge combustion condition and the stratified charge combustion condition.

15. A fuel injection control method for a cylinder direction injection spark-ignition internal combustion engine, the method comprising:
- judging a homogeneous charge combustion condition which requires homogeneous charge combustion and a stratified charge combustion condition which requires stratified charge combustion, in accordance with an engine operating condition, fuel being supplied on an intake stroke so as to form a rich equivalence ratio in the homogeneous charge combustion, fuel being supplied on a compression stroke so as to form a lean equivalence ratio in the stratified charge combustion, the rich equivalence ratio being richer than the lean equivalence ratio;
- regulating fuel to be injected into a cylinder of the engine so that first and second quantities are injected respectively on the intake and compression strokes in each cycle of the cylinder, the first and second quantities corresponding respectively to first and second allocation rates of fuel;
- setting the first and second allocation rates in accordance with an air-fuel ratio of an air-fuel mixture to be formed in the cylinder; and
- gradually changing over an equivalence ratio within a range between the rich and lean equivalence ratios when the engine operation is changed over between the homogeneous charge combustion condition and the stratified charge combustion condition.

* * * * *